Sept. 14, 1954  R. C. GOERTZ ET AL  2,689,318
LOAD TORQUE RESPONSIVE FOLLOW-UP SYSTEM
Filed July 18, 1951
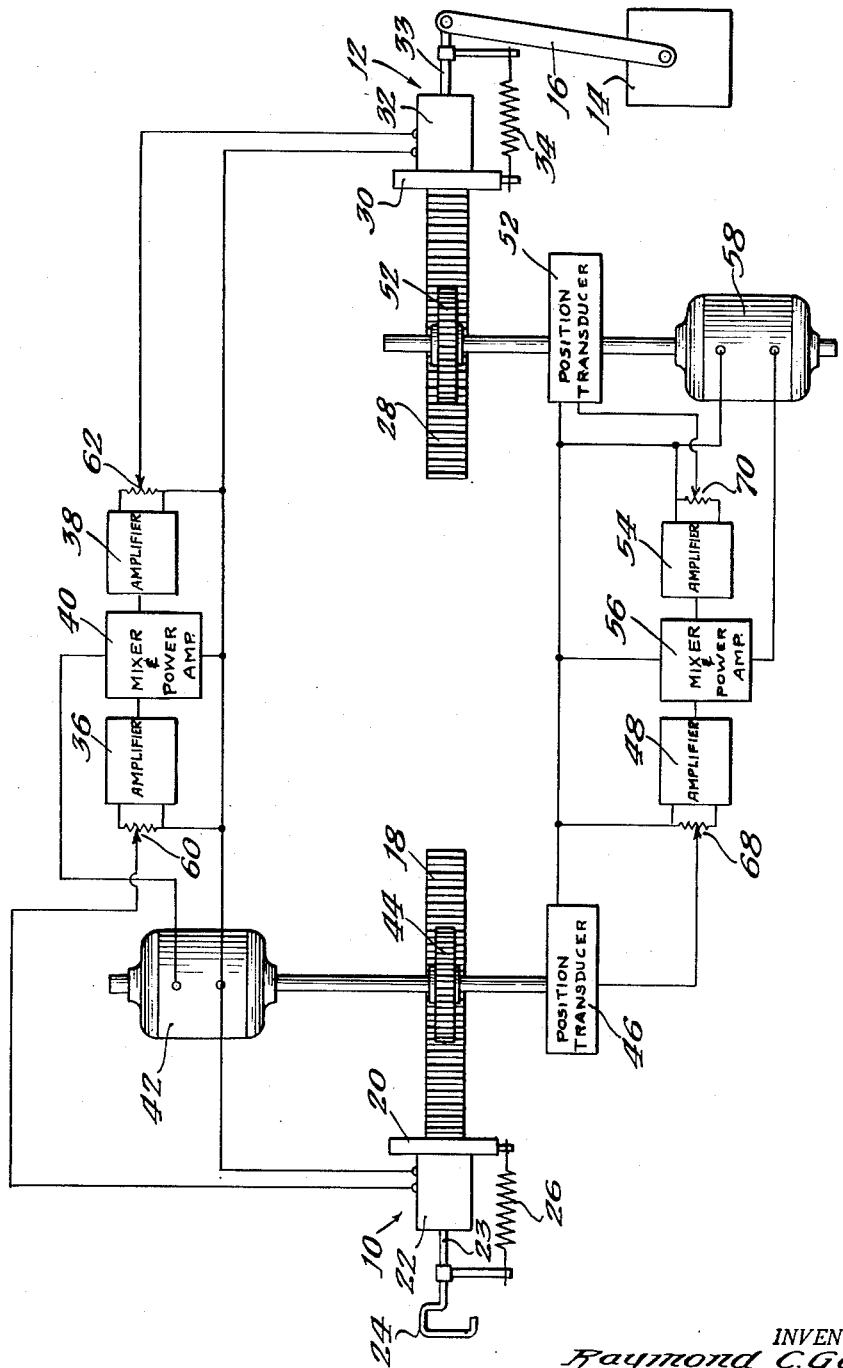
INVENTORS.
Raymond C. Goertz
Frank Bevilacqua
By: Roland A. Anderson
Attorney Patented Sept. 14, 1954

2,689,318

UNITED STATES PATENT OFFICE 2,689,318

LOAD TORQUE RESPONSIVE FOLLOW-UP SYSTEM

Raymond C. Goertz, Elmhurst, and Frank Bevilacqua, Downers Grove, Ill., assignors to the United States of America as represented by the United States Atomic Energy Commission Application July 18, 1951, Serial No. 237,394

2 Claims. (Cl. 318—19)

The present invention relates to methods and devices for remotely positioning objects, and more specifically it relates to positioning devices and methods in which the force restraining the motion of the object is reflected from the load end of the positioning device to the control end.

The remote positioning devices of the past have transmitted forces in only one direction, namely, from the control end of the device to the load end of the device where they are utilized to position a load. The operator at the control end was not aware of the magnitude of the resisting forces at the load end of the mechanism, and whenever these resisting forces became too great, a portion of the positioning device would usually suffer damage. On the other hand, when the object being positioned was of a delicate nature, it was very apt to be crushed by the application of excessive forces at the control end of the positioning device. Also, operations were difficult with the devices previously known in the art, because skill comparable to that attained by the human hand was not possible. Hence, it is an object of the present invention to eliminate these difficulties by providing methods for operating remote positioning mechanisms which will reflect the restraining force at the load end of the mechanism to the operator's hand at the control end of the mechanism, and to provide a remote positioning mechanism which utilizes such a method.

Many of the previously known devices for remotely positioning objects which produce the same character of motion at the load end as is applied to the control end rely upon mechanical linkage between the control and load ends. Such devices are limited as to the permissible separation distance between the load and control ends because of friction and mechanical practicability. Hence, it is a further object of the present invention to provide a device transmitting the same character of motion from the control end to the load end for remotely positioning objects in which the load and control ends may be separated by virtually unlimited distances; and to provide methods of operating remote positioning devices which permit the transmission of forces having the same character of motion at the load end as used to drive the control end, and which permit wide separation of the control and load ends.

Another defect common to the devices known in the art has been termed "sponginess," meaning a force conveyed to the operator by the control end of the remote positioning device which appears to have been caused by the load end having been stopped by a resilient object, when in fact the load end has been stopped by a rigid object. This results when a relatively large movement of the control end of the positioning device is required in order to produce a relatively small movement at the load end of the device. Hence, it is a further object of the present invention to provide a remote positioning device in which the ratio of the displacement of the control end to the displacement of the load end of the device may be selected independently of force magnitudes and mechanical considerations, thus minimizing the spongy characteristics of the device.

Other objects and advantages will become readily apparent to the man skilled in the art upon a further reading of the specification, especially when the specification is considered in the light of the drawing which consists of a single figure schematically illustrating the invention.

The positioning device has a control end 10 and a load end 12 which is illustrated as connected to a load 14 by means of an arm 16. The arm 16 could be a throttle controlling an engine or some other device. It is to be noted that the control end 10 and the load end 12 are connected together only by electrical connections.

The control end 10 has a rack 18 which is mounted to reciprocate by any of the conventional means. A plate 20 is affixed at one end of the rack 18, and an electromechanical transducer 22 is rigidly mounted upon the plate 20. The transducer 22 is provided with a reciprocating element 23 which terminates in a handle 24, the handle 24 being adapted to be manipulated by the hand of the operating person. A spring 26 is affixed between the handle 24 and the mounting plate 20, and has an equilibrium position within the range of motion of the element 23.

The load end 12 of the positioning device includes a construction similar to that of the control end 10 described above. A rack 28 is mounted to reciprocate in a manner similar to the rack 18 of the driven end. A mounting plate 30 is affixed to one end of the rack 28, and an electromechanical transducer 32 is mounted rigidly to the mounting plate 30. The transducer 32 is also provided with a reciprocating element 33, however, it is attached to the arm 16 of the load 14. A spring 34 is attached between the mounting plate 30 and the reciprocating element 33 of the transducer 32, and has an equilibrium position within the range of motion of the element 33.

The transducer 22 at the control end 10 of the positioning device is electrically connected to the input of a first amplifier 36, and the transducer 32 at the load end 12 of the positioning device is electrically connected to the input of a second amplifier 38. The outputs of both amplifier 36 and amplifier 38 are connected to the inputs of a mixer and power amplifier 40. The mixer may be any of the well known types, such as a vacuum tube mixer, or simply a common load resistor, and if the output of the mixer alone is adequate, the power amplifier will not be required. The output of the mixer and power amplifier 40 is connected to a control motor 42 which is mechanically coupled to the rack 18 at the control end 10 of the positioning device by means of a pinion gear 44. The mixer and power amplifier 40 produces a voltage monotonically related to the difference in the voltages appearing in the outputs of the two amplifiers 36 and 38. The difference voltage appearing in the output of the mixer and power amplifier 40 is applied to the control motor 42 to rotate the motor in the same direction as the force applied to the handle 24. For this reason, the control motor 42 must produce a torque monotonically related to the voltage applied to the motor and reverse directions for changes in voltage polarity.

A second servo system also couples the control end 10 to the load end 12 of the positioning device. A first electromechanical position transducer 46 is mechanically coupled to the rack 18 by the pinion gear 44 at the control end 10 of the positioning device. This position transducer 46 is electrically connected to the input of a first amplifier 48. A second electromechanical position transducer 50 is mechanically coupled to the rack 28 of the load end 12 of the positioning device by means of the pinion gear 52. This second position transducer 50 is electrically connected to the input of a second amplifier 54. The outputs of both the first amplifier 48 and the second amplifier 54 are connected to the inputs of a mixer and power amplifier 56 which produces a difference voltage from the outputs of the two amplifiers 48 and 54. The output of the mixer and power amplifier 56 is electrically connected to a control motor 58 which is also mechanically coupled to the rack 28 and the load end 12 of the positioning device by the pinion gear 52. The direction of rotation of the control motor 58 may be selected by connecting the motor 58 with the output of the mixer and power amplifier 56 so that the current will flow through the motor 58 in the proper direction to produce the desired direction of rotation.

When a force is applied to the handle 24 on the control end 10 of the positioning device, two separate servo systems are put into action. First, the transducer 22 generates a voltage which tends to excite the control motor 42 to drive the control end 10 in the direction in which the force is applied to the handle 24, but which is reduced by the magnitude of the voltage produced by the transducer 32 at the load end 12 in response to the restraining force placed upon the load end 12 by the load 14. Thus, the motor 42 can be expected to drive the control end 10 in the direction in which the force is applied until the voltage which is generated by the transducer 32 at the load end 12 and amplified by the amplifier 38 approximately cancels the output from the mixer and power amplifier 40.

Secondly, the first position transducer 46 coupled to the control end 10 produces a voltage monotonically related to the displacement of the control end 10, and the difference between this voltage and the voltage produced by the second position transducer 50 coupled to the load end 12 drives the control motor 58 which is mechanically coupled to the load end 12 and the load 14. The direction of the rotation of the control motor 58 may be selected in accordance with the characteristics of the load 14, since it may be connected to the mixer and power amplifier 56 to conduct current in either direction.

It is thus clear, that the two servo mechanisms will operate to drive both the control end 10 and the load end 12 to reduce the outputs from the mixer and power amplifiers 40 and 56 to approximately zero, at which time motion ceases. Since the position of the handle 24 is controlled by the operator at the control end 10, equilibrium can only be established by rotation of the control motor 58 at the load end 12 which in turn accomplishes two results. First, the change in position of the rack 28 at the load end 12 changes the voltage output from the transducer 32 until the voltage output from the mixer and power amplifier 40 which is applied to the control motor 42 at the control end 10 drops to a value insufficient to operate the motor 42. Secondly, rotation of the control motor 58 also changes the magnitude of the voltage developed by the second position transducer 50 which is mechanically coupled to the load end 12 until the magnitude of the voltage appearing at the output of the mixer and power amplifier 56 falls to a value insufficient to operate the control motor 58. Under these conditions the positioning device is in complete equilibrium and further motion of the load end 12 will not occur until a displacement of the handle 24 at the control end 10 is effected. The springs 26 and 34 make the output voltages from the transducers 22 and 32 monotonically related to force applied, rather than the position of the reciprocating elements 23 and 33.

It will be noted that the inputs of the amplifiers 36, 38, 48 and 54 are provided with potentiometers 60, 62, 68 and 70 for adjusting the gain of the amplifiers. The sponginess, or resiliency imparted when the operator moves the handle 24, may be greatly reduced by operating the amplifiers 36, 38, 48 and 54 at high gain, since this will have the effect of producing a large voltage upon the control motors 42 and 58 responsive to a relatively small output from the transducers 22 and 32. Also, it is possible to transmit a much larger force to the load end 12 than is applied at the control end 10 of the positioning device. This may be accomplished by operating amplifier 36 at a higher gain than amplifier 38, so that control motor 42 develops a lower torque than control motor 58 to establish equilibrium. Hence, the ratio of the force developed at the load end 12 of the positioning device to that exerted at the control end 10 may be independently selected and is determined by the ratio of the torque developed by control motor 58 to the torque developed by control motor 42.

It is also possible to select the ratio of the displacement of the load end 12 to the displacement of the control end 10 by adjusting the relative gains of the amplifiers 48 and 54. If amplifier 48 is operated at high gain relative to amplifier 54, a small displacement of the control end 10 will produce a large displacement of the load end 12, and vice versa.

In any event, the output voltage from the mixer and power amplifiers 40 and 56 must become approximately zero for the same positions of the load end 12 and the control end 10 of the positioning device in order to achieve a steady state. However, the mixer and power amplifiers 40 and 56 may deliver small outputs to the control motors 42 and 58 in the steady state if the torques developed by the motors 42 and 58 as a result of these outputs are not sufficient to overcome friction or the force exerted by the load 14.

It will be seen, that the remote positioning device here disclosed requires only three connecting electrical wires between the control end 10 and the load end 12, two of the wires shown in the figure being treated as a common wire. This makes it possible to separate the two ends 10 and 12 of the positioning device by whatever distance is required or desired.

It has been found that the transducers 22 and 32 may be linear differential transformers, but any device which will produce a voltage monotonically related to the force applied thereto is suitable for transducers 22 and 32. Also, control motors 42 and 58 may be replaced by any means producing a torque monotonically related to a voltage and reversing the direction of the torque when the characteristics of the voltage applied from the mixer and power amplifiers 40 and 56 reverse. The positioning transducers 46 and 50 may be servo transformers.

The man skilled in the art will readily devise many other methods and devices within the intended scope of this invention from the teachings of this specification. For example, either A. D. or D. C. servo systems may be employed. Further, mechanical systems for reflecting forces from the load end 12 to the control end 10 of the device could also be used and achieve some of the advantages of the invention disclosed. In the embodiment disclosed, rectilinear motion alone has been utilized, but rotational motion could equally well have been used. For these reasons, it is intended that the scope of the present invention be not limited to the specific embodiment disclosed, but rather only by the appended claims.

What is claimed is:

1. Apparatus for positioning an object comprising, in combination: a control end including a rack, a pinion gear meshed with the rack, a D. C. control motor mechanically coupled to the pinion gear, a D. C. servo transformer mechanically coupled to the pinion gear, and a transducer having a reciprocating element, said transducer being mounted upon the rack and adapted to produce a voltage monotonically related to the force applied thereto; a load end including a rack, a pinion gear meshed with the rack, a servo transformer mechanically coupled to the pinion gear, a control motor mechanically coupled to the pinion gear, and an electro-mechanical transducer mounted to the rack and having a reciprocating element adapted to be attached to the object being positioned; a first electrical coupling network connected between the control and load ends of the device including a first amplifier having an input connected to the transducer mounted at the control end of the device, a second amplifier having an input electrically connected to the transducer at the load end of the device, and a mixer having inputs connected to the outputs of the amplifiers and an output connected to the control motor at the control end of the device; and a second electrical coupling network connected between the load and control ends of the device including a first amplifier having an input electrically connected to the servo transformer at the control end of the device, a second amplifier having an input electrically connected to the servo transformer at the load end of the device, a mixer having inputs connected to the outputs of the two amplifiers, and an output connected to the control motor at the load end of the device.

2. Apparatus for positioning an object comprising the elements of claim 1 in combination with a first spring mechanically affixed to the rack and reciprocating element of the transducer at the control end of the device, and a second spring mechanically affixed to the rack and to the reciprocating element of the transducer at the load end of the device.

References Cited in the file of this patent

UNITED STATES PATENTS

| Number | Name | Date |
|---|---|---|
| 2,440,838 | Yardeny | May 4, 1948 |
| 2,451,263 | Webb | Oct. 12, 1948 |
| 2,475,484 | De Nise | July 5, 1949 |
| 2,511,846 | Halpert | June 20, 1950 |
| 2,537,083 | Peoples, Jr. | Jan. 9, 1951 |

FOREIGN PATENTS

| Number | Country | Date |
|---|---|---|
| 521,214 | Germany | Mar. 19, 1931 |